United States Patent
Gum et al.

(10) Patent No.: US 8,531,332 B2
(45) Date of Patent: Sep. 10, 2013

(54) ANTI-SPOOFING DETECTION SYSTEM

(75) Inventors: Arnold J. Gum, San Diego, CA (US); Douglas Neal Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 12/728,974

(22) Filed: Mar. 22, 2010

(65) Prior Publication Data

US 2011/0227787 A1 Sep. 22, 2011

(51) Int. Cl.
    *G01S 19/33* (2010.01)
(52) U.S. Cl.
    USPC ............................. 342/357.73
(58) Field of Classification Search
    USPC ............................. 342/357.77
    See application file for complete search history.

(56) References Cited

U.S. PATENT DOCUMENTS

| | | | |
|---|---|---|---|
| 5,684,696 A | 11/1997 | Rao et al. | |
| 5,999,124 A | 12/1999 | Sheynblat | |
| 6,289,280 B1 | 9/2001 | Fernandez-Corbaton et al. | |
| 6,420,999 B1 | 7/2002 | Vayanos | |
| 6,697,629 B1 | 2/2004 | Grilli et al. | |
| 8,022,877 B2 * | 9/2011 | Alizadeh-Shabdiz | 342/458 |
| 8,063,820 B2 * | 11/2011 | Alizadeh-Shabdiz | 342/357.73 |
| 8,259,010 B2 | 9/2012 | Ische et al. | |
| 2005/0146459 A1 | 7/2005 | Dentinger et al. | |
| 2007/0156338 A1 * | 7/2007 | Coatantiec et al. | 701/214 |
| 2009/0322598 A1 | 12/2009 | Fly et al. | |
| 2010/0127928 A1 | 5/2010 | Thomson et al. | |
| 2010/0134352 A1 | 6/2010 | Thomson et al. | |
| 2011/0306337 A1 * | 12/2011 | Wirola et al. | 455/423 |

OTHER PUBLICATIONS

International Search Report and Written Opinion—PCT/US2011/029475—ISA/EPO—Jun. 6, 2011.

* cited by examiner

*Primary Examiner* — Harry Liu
(74) *Attorney, Agent, or Firm* — Thien T. Nguyen

(57) ABSTRACT

Spoofing of a satellite positioning system is detected by receiving position location data from multiple sources. The received data is compared and inconsistent data is marked. A position location is estimated based on the received position location data, while accounting for the marked inconsistent data.

19 Claims, 5 Drawing Sheets

ANTI-SPOOFING DETECTION SYSTEM

FIELD OF TECHNOLOGY

The present disclosure relates generally to position determination. More particularly, an anti-spoofing detection system pertains to detecting counterfeit position location data transmitted by a counterfeit signal source, discarding those counterfeit signals and, where possible, establishing a position unaffected by the counterfeit signals.

BACKGROUND

Because of widespread use of satellite positioning systems by stationary and mobile communications systems that include mobile terminals, such as cellular telephones, "spoofing," the use of counterfeit positioning signals to provide a false location to a device, is of growing concern.

The Global Positioning System (GPS) is owned and operated by the U.S. Department of Defense, but is available for general use around the world. Other satellite positioning systems are also in use including but not limited to Glonass and Gallileo. Collectively, these and other similar systems are referred to in this document as satellite positioning systems (SPS). Briefly, SPS includes functioning satellites and back-up satellites that orbit above the Earth. SPS satellites continually broadcast their position and time. On earth, each SPS receiver, (collectively, "receiver" in this document) may contain a processor capable of trilaterating or multilaterating its own position through the use of SPS signals.

Positioning systems often augment traditional SPS signal sources through the use of signals from wireless base stations and other terrestrial transceivers. These base station signals can be used either as incremental location signals or as replacement signals to calculate the location of the receiver. Similar to SPS technology, the base station signals can be used to trilaterate or multilaterate the location the location of the mobile terminal independently of, or in conjunction with, SPS signal sources. Multiple functionalities now are prevalent in personal portable and/or mobile wireless communications instruments such as mobile terminals. It is now common for a mobile terminal to include a satellite positioning system receiver (in this document, an "SPS receiver"). A device containing an SPS receiver also includes a power supply system. The power supply system includes at least one battery and may include an alternative external power connector for connecting a mobile terminal to an external power source. A device containing an SPS receiver also may include at least one processor and at least one storage medium, such as random access memory (RAM) and FLASH memory (in this document, "memory"). In the case of a mobile terminal, the device also includes a wireless communications transceiver (in this document, a "wireless transceiver"). As indicated in the "Definitions" provisions of this document, a variety of satellite positioning systems, mobile terminals, communication networks including mobile wireless communication systems, and/or position determination systems may be used to facilitate implementation of the anti-spoofing detection system disclosed in this document.

It is apparent, therefore, in view of the reliance on SPS by many people and institutions, that spoofing of location information signals to create a false location calculation is not only unacceptable, but may dramatically affect commercial and national interests.

One way to degrade use of an SPS system is to jam it. Simply jamming an SPS is annoying, but is less consequential because the victim may be alerted to jamming, and/or the location calculation may be completed utilizing other signal sources, such as wireless communication system signals. Undetected spoofing, may result, however, in the use of a false location. The target of spoofing may be unaware that signals received are, in fact, counterfeit or inauthentic. Thus, the spoofed signals may be used in a position calculation that will impact actions dependent on an accurate location, such as navigation and tracking. Detecting such a spoofed signal and its resulting incorrect location information is, therefore, critical.

As regards the process of spoofing, one method includes a counterfeit or inauthentic signal source broadcasting counterfeit location signals at a higher power level than the actual location signals, possibly in conjunction with blockage or attenuation of the actual signals.

Determination of the location of the mobile terminal through the use of terrestrial communications signals generally requires identification of visible base transceiver stations, location of the base transceiver stations, and timing information to determine signal delay or signal strength between each base transceiver station and the wireless mobile transceiver. These methods are known in the art. In general, because the communication system must not only provide signals for location, but also for communications purposes, base transceiver station signals are more difficult and less likely to be spoofed than SPS signals, which generally are unidirectional.

Detecting such a spoofed signal and its consequent incorrect location information therefore is important. At least the following rely on one or more SPS's to function properly: truckers and truck dispatchers, power stations, air traffic control centers, banks and other financial institutions and police. A broad array of location-based services, such as asset tracking and theft prevention, felon tracking, geographic information system (GIS) resource lookup and child locators also depend on accurate SPS location.

When a mobile terminal operatively connectable to an SPS is powered on, it may establish a communication link with a base transceiver station. The mobile terminal will typically receive pilot signals from multiple base transceiver stations. The mobile terminal will search for signals from these base transceiver stations to establish a communication link with a selected base transceiver station to permit the reception and transmission of data over the established communication link. Transmitter or transceiver location information references, generally called "almanacs," include transceiver identification information for base transceiver stations and transceiver location information.

SUMMARY

The anti-spoofing detection system disclosed, illustrated, and claimed in this document includes an apparatus, system and method of detection and compensation for spoofing of position location signals in the calculation of position location. Detection includes detecting counterfeit position location data through comparison with signals from one or more higher reliability sources or by comparison against known transmitter information such as base station proximity as specified in a base station almanac, or by evaluating multiple sources and discarding the signals that would result in a calculated location significantly different from that predicted by the other sources.

In one embodiment, the trusted position data may be obtained from a reliable and trustworthy reference resource, such as a base station almanac comprising at least the known locations and identifications of visible base stations. The base station almanac may be used to provide an approximate location of the mobile terminal such as through the location of the nearest base station or through trilateration or multilateration utilizing signals from multiple base stations. Because base station communication is more difficult to spoof than SPS signals, the base station-based location estimate can be compared against the location predicted by the visible SPS signals. In the case of significant disagreement between the two locations, the SPS-based information can be discarded and the calculation based on terrestrial sources.

A similar technique could be used to discard invalid terrestrial sources. For example, short-ranged wireless protocols, such as WiFi, Bluetooth or Personal Area Network (PAN) transceivers providing faulty location information may be ignored when the information is inconsistent with wireless WAN or SPS sources. Also, the location predicted by WAN sources, such as base transceiver stations, can be used to predict SPS signals and, in the case of a large discrepancy between the predicted SPS signals and the measured SPS signals, the measured signals may also be rejected (as spoofed) directly without calculating an SPS-based location. Furthermore, in some embodiments, a flag may be set or an alert may be sent in conjunction with a potential spoofing detection.

In one aspect, a method for estimating a position location of a mobile device includes receiving position location data from multiple sources. The method also includes comparing the received position location data, and marking inconsistent data based on the comparison. The position location based is estimated based on the received position location data, while accounting for the marked inconsistent data.

In another aspect, a computer-readable medium includes program code tangibly stored thereon. The medium includes program code to receive position location data from a plurality of sources, and program code to compare the position location data. The medium also includes program code to mark inconsistent data based on the comparison; and program code to estimate a position location based on the received position location data, while accounting for the marked inconsistent data.

In still another aspect, an apparatus for estimating a position location includes at least one receiver that receives position location data from a plurality of sources. The apparatus also includes a processor that: compares the received position location data, marks inconsistent data based on the comparison, and estimates the position location based on the received position location data, while accounting for the marked inconsistent data.

In still another aspect, an apparatus for estimating a position location includes at least two receivers that receive position location data from a plurality of sources comprising at least two different technologies. The apparatus also includes a processor that: compares the received position location data, compares the location predicted by sources comprising different technologies, and, if there are inconsistent locations predicted, chooses sources on the more reliable of the two technologies or, if consistent locations are predicted, includes sources from the consistent sources, and estimates the position location based on the selected received position location data.

It will become apparent to one skilled in the art that the claimed subject matter as a whole, including the apparatus, and the cooperation of the elements of the apparatus, combine to result in a number of unexpected advantages and utilities. The structure and co-operation of structure of the anti-spoofing detection system will become apparent to those skilled in the art when read in conjunction with the following description, drawing figures, and appended claims.

The foregoing has outlined broadly the more important features of the present teachings to better understand the detailed description that follows, and to better understand the contributions to the art. The anti-spoofing detection system is not limited in application to the details of construction, and to the arrangements of the components and/or methods, provided in the following description and drawing figures, but is capable of other embodiments and aspects, and of being practiced and carried out in various ways. The phraseology and terminology employed in this disclosure are for purpose of description and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the anti-spoofing detection system, which is measured by the claims, nor intended to limit the scope of the claims. The novel features of the anti-spoofing detection system are best understood from the accompanying drawing, considered in connection with the accompanying description of the drawing, in which similar reference characters refer to similar parts, and in which:

Figure 1:
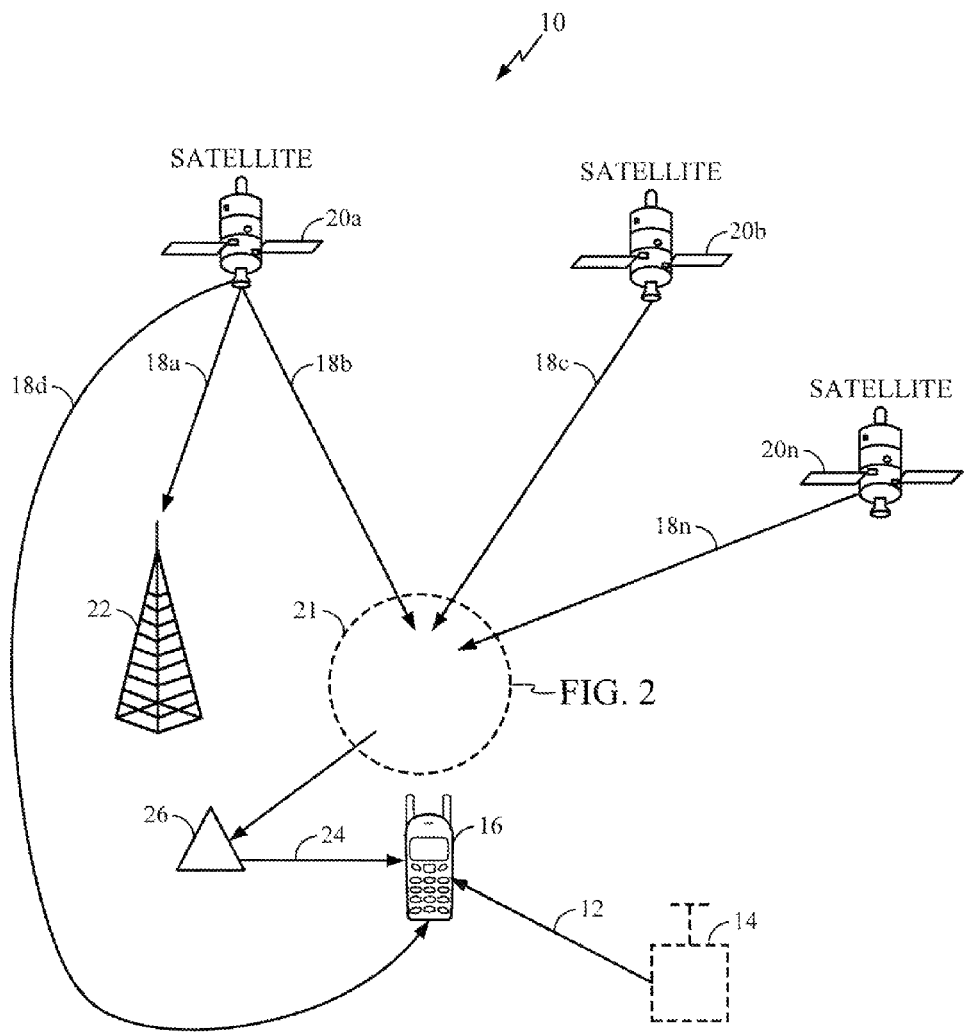
FIG. 1 of the drawing is a diagrammatic view of the environment in which the anti-spoofing detection system operates.

To the extent that the numerical designations in the drawing figures include lower case letters such as "a,b" such designations include multiple references, and the letter "n" in lower case such as "a-n" is intended to express a number of repetitions of the element designated by that numerical reference and subscripts.

DETAILED DESCRIPTION

Definitions

The term "simulated" as used in this document in conjunction with the word "signal" means a signal transmitted from a transmitter or transceiver, in conjunction with a simulator such as a base station simulator or a satellite position signal (SPS) simulator, that may replicate and/or imitate an authentic signal and appears as an authentic signal to at least one terminal such as a mobile terminal, while in fact being an inauthentic or counterfeit signal. The terms "inauthentic" and "counterfeit" are used interchangeably in this document.

The term "positioning system" and/or "SPS" means, within the context of this document, at least a location determination system consisting individually and/or in a combination of methods and apparatus used with (a) terrestrial location determination systems and with (b) various satellite positioning systems such as the United States Global Positioning System (GPS), the Russian Glonass system, the European Galileo system, any system that uses satellites from a combination of satellite systems, or any satellite system to be developed in the future. The disclosed anti-spoofing detection system of this document may be used with position determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal which may be synchronized with GPS time. Each such transmitter may be assigned a unique PN code so as to permit identification by a remote receiver and/or transceiver.

The term "base transceiver station" and/or "BTS" means equipment that facilitates wireless communication between user equipment, such as a mobile terminal, and a network, usually a mobile wireless communication system. Thus user equipment includes devices like mobile phones, handsets, Wireless Local Loop (WLL) phones, computers with wireless interne connectivity, WLAN and WiMAX devices. The network can include any wireless communication technologies like GSM, CDMA, WLL, WAN, WiFi, and WiMAX, WCDMA and LTE, among others. A base transceiver station may have a plurality of transceivers that allow it to serve several different frequencies and different sectors of the cell in the case of sectorised base stations. In some configurations, a base transceiver station is controlled by a parent base station controller via the base station control function (BCF).

The term "mobile terminal" means at least a mobile and/or portable wireless communications instrument capable of communication across a wireless communications system that, in general, includes an array of operatively connected communication devices adapted to receive and transmit at least electromagnetic signals across the system using infrared light and radio signals, and includes a telecommunications system in which electromagnetic waves, rather than some form of wire, carry the signal over all or part of the communication path. The term "mobile terminal" thus means at least a cellular phone, a pager, a satellite telephone, a two-way pager, a personal digital assistant (PDA) having wireless capabilities, a personal navigation device, a personal information manager, a portable computer having wireless capabilities, wireless local area networks, and any other type of wireless device having transmission capabilities that may also be one or more versions of a personal communications services device, sometimes referred to as "PCS," including at least the wireless communications technologies identified on a non-exclusive basis in the above definition of "base transceiver system." The term "mobile terminal" also includes devices that communicate with a personal navigation device, sometimes referred to as "PND," such as by short-range wireless, infrared, wireline connection, or other connection, regardless of whether satellite signal reception, assistance data reception, and/or position-related processing occurs at the device or at the PND. The term "mobile terminal" also is intended to include all devices, including wireless communications devices, computers, laptops and similar devices that are capable of communication with a server, such as across the Internet, WiFi, or other network, and regardless of whether satellite signal reception, assistance data reception and/or position-related processing occurs at the device, at a server, or at another device associated with the network. Any combinations of the above also are considered a "mobile terminal."

The term "location" and "position" mean the physical and geographic location of one or more mobile wireless communications instruments or other devices determined by any technique, technology, or system, or any combination of techniques, technologies, or systems, known or as yet unknown, for determining location parameters. Currently, such techniques and apparatus used for various wireless communication networks such as an SPS system in combination with a wireless wide area network, sometimes referred to as "WWAN," a wireless local area network, sometimes referred to as "WLAN," a wireless personal area network, sometimes referred to as "WPAN," among others. The term "network" and "system" are often used interchangeably. A WWAN may be a Code Division Multiple Access, sometimes referred to as a "CDMA" network, a Time Division Multiple Access (TDMA) network, a Frequency Division Multiple Access (FDMA) network, an Orthogonal Frequency Division Multiple Access (OFDMA) network, and a Single-Carrier Frequency Division Multiple Access (SC-FDMA network, among others. A CDMA network may implement one or more radio access technologies such as cdma2000, Wideband-CDMA, among others. Cdma2000 includes IS-95, IS-2000, and IS-856 standards. A TDMA network may implement Global System for Mobile Communications (GSM), Digital Advanced Mobile Phone System (D-AMPS), or other radio access technologies. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

The term "instructions" means expressions that represent one or more logical operations. For example, instructions may be machine-readable by being interpretable by a machine for executing one or more operations or one or more data objects. However, this is merely an example of instructions, and the claimed subject matter is not limited in this respect. Instructions may relate to encoded commands which are executable by a processing circuit having a command set which includes the encoded commands. Such instructions may be encoded in the form of a machine language understood by the processing circuit. Again, these are merely examples of instructions and the claimed subject matter is not limited in this respect.

The term "storage media" means media capable of maintaining expressions that are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, and volatile or non-volatile devices memory devices. However, these are merely examples of a storage medium, and the claimed subject matter is not limited in these respects.

The terms "processing," "computing," "calculating," "selecting," "forming," "enabling," "inhibiting," "locating," "terminating," "identifying," "initiating," "detecting," "obtaining," "hosting," "maintaining," "representing," "estimating," "reducing," "associating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in storage medium, for example. Such machine-readable instructions may comprise, for example, software or firmware stored in a storage medium included as part of a computing platform (e.g., included either as part of a processing circuit or external to such a processing circuit). Further, the process and method described in this document, with reference to flow diagrams or otherwise, may also be executed and/or controlled, in whole or in part, by such a computing platform.

The term "exemplary" means serving as an example, instance, or illustration; any aspect described in this document as "exemplary" is not intended to mean preferred or advantageous over other aspects of the method of improving battery life as described in this document.

Description

As indicated, because SPS-related technologies are widespread, spoofing signals challenge the reliability of SPS position location, and consequently challenges users' trust and confidence in SPS-related technologies. Addressing problems of spoofing is, thus, important to maintaining the integrity of SPS systems. Therefore, it can be appreciated that there is a significant need for a technique and method for detecting spoofing of a satellite positioning system. The present disclosure provides this capability as will be apparent from the following detailed description and accompanying figures.

As illustrated by cross-reference between FIGS. 1-4, an anti-spoofing detection system is provided that, in its broadest context, includes detecting unverified position location data, conducting a comparison of the unverified position location data with higher confidence position location to obtain a first calculated position, and determining the validity of the unverified position location data.

More specifically, at least one aspect of the anti-spoofing detection system 10 is illustrated by cross-reference between FIGS. 1-4. As illustrated, a method is shown that includes detecting unverified position location data. The unverified position location data may include one or more counterfeit, erroneous or inauthentic and/or unverified signals 12 from one or more inauthentic and/or unverified signal sources 14. As illustrated in FIG. 1, the one or more inauthentic signal sources 14 is shown in phantom as an aid in understanding the inauthentic nature of the unknown origin of inauthentic and/or unverified signal 12. The unverified position location data that may include one or more inauthentic signals 12 from one or more inauthentic signal sources 14 may be received by a mobile terminal 16 or a plurality of mobile terminals. Only a single mobile terminal 16 is shown to clarify the teaching of this document.

The comparison between the higher confidence position location data, and the unverified position location data, which may be an effort to spoof the SPS system, may involve comparing the location predicted by the unverified position data against the location predicted by the higher confidence position location data for consistency. In other embodiments, an evaluation of the convergence of the data into a single solution may be used. In still other embodiments a determination of data outliers may be conducted. The evaluation for consistency may include reference to alternative signal sources. A range of possible, but not exclusive, appraising signal reliability criteria include satellite position system signals, base transceiver station signals, Femtocell signals, WLAN signals, and/or other signals bearing location position data. In another embodiment, base transceiver station signals from base stations in communication with the mobile are considered the most trustworthy. Where multiple signal source types predict a consistent location, the inconsistent source may be considered to be of lower confidence. In addition, in comparing the relative confidence of sources, the difficulty of simulating an active source and consistency with known information such as prior location calculations and almanac information may be taken into account.

As indicated, an aspect of the anti-spoofing detection system 10 is illustrated in FIG. 1. As shown, position location signals 18$a$-$n$ are transmitted from one or more satellites 20$a$-$n$. The position location signals 18$a$-$n$ transmitted from one or more satellites 20$a$-$n$ may be received by a Wide Area Reference Network (WARN) 21 and a first base transceiver station, or base transceiver station 22, as well as a mobile terminal 16. The WARN 21 forwards the satellite information to a location server 26, which transmits position location information 24 to any number of receivers and/or transceivers and/or servers and/or terminals, including the handset or mobile terminal 16 that has been activated to communicate with the base transceiver station 22 across a mobile wireless communications system, and whose user is seeking to establish a position location using SPS technology included in the mobile terminal 16. The transmission of such one or more position location signals 24 and position location signals 18$a$-$n$ from satellites 20$a$-$n$ is illustrated in FIG. 1.

As also illustrated in FIG. 1, the inauthentic or counterfeit signal 12 (also, in this document, "spoofing signal") may be generated by a simulator such as a SPS simulator or a base station simulator, possibly transmitted by the transmitter 14 into a limited area. The transmitter 14 may transmit at a higher signal power, possibly in conjunction with a signal occluded environment or an active jammer, to reduce the likelihood that the mobile device will detect the actual SPS or other location signals. Alternately, the spoofing signal may be generated by an actual transceiver such as a WiFi or Bluetooth access point, the transceiver having false or misleading identification associated with it.

Figure 2:
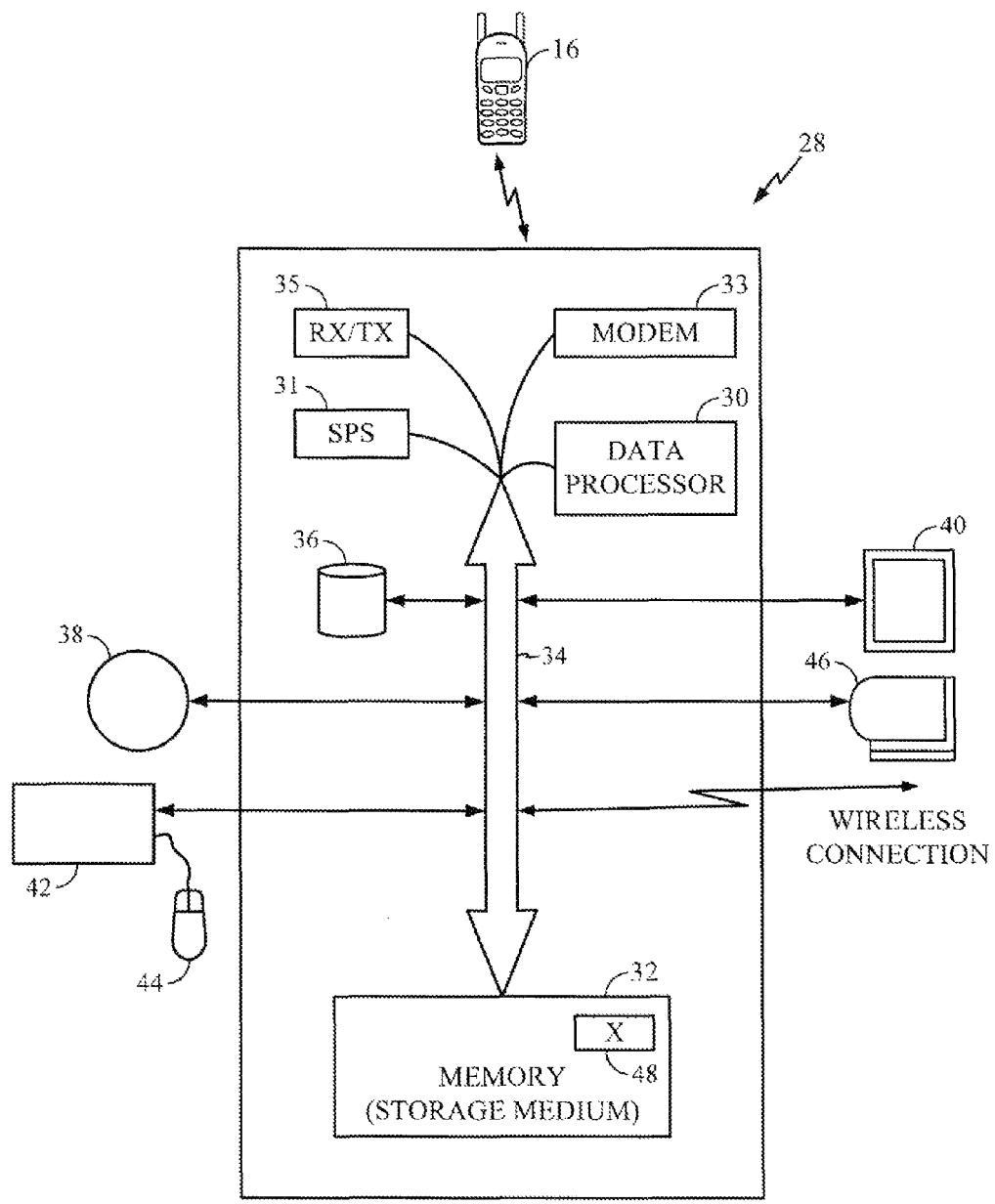
FIG. 2 is a diagrammatic view of a data processing system which supports the anti-spoofing detection system.

FIG. 2 illustrates by cross-reference with FIG. 1 that the mobile terminal 16 includes at least one computer processing system 28. As shown, the computer processing system 28 is operatively connected to the mobile terminal 16. In one aspect, the computer processing system 28 is housed in the mobile terminal 16. The computer processing system 28 is adapted to receive, store, process, and execute instructions at least in connection with location position data.

The computer processing system 28 of the mobile terminal 16 is illustrated in the block diagram of FIG. 2. As shown, the computer processing system 28 may include a variety of components to enable the mobile terminal 16 to receive, process, store, and execute instructions in connection with data and information about position location data, including inauthentic signal 12 (FIG. 1) and position signals 18$a$-$n$ (FIG. 1), and base transceiver station position location signal 24 (FIG. 1) that includes position location data. The components may include a data processor 30, a position location receiver (e.g., a SPS receiver) 31, a storage medium 32, a wireless modem 33, and a cellular transceiver 35, all coupled by a bus 34. Storage medium 32 is a machine- or computer-readable medium and may include is not limited to volatile memories such as DRAM, and SRAM, as well as non-volatile memories such as ROM, FLASH, EPROM, EEPROM and bubble memory.

Also connectable to the bus are optional secondary storage 36, external storage 38, output devices such as a monitor 40 that may be included with the mobile terminal 16 and, in optional configurations, an input device such as a keyboard 42, a mouse 44, and a printer 46. Secondary storage 36 may include machine-readable media such as, but not limited to, a hard disk drive, a magnetic drum, and a bubble memory. External storage 38 may include machine-readable media such as a floppy disk, a removable hard drive, a magnetic tape, CD-ROM, removable memory cards, and even other computers connected via a communications line. The distinction between secondary storage 36 and external storage 38 is primarily for convenience in describing the use of machine readable memory in the environment of the anti-spoofing detection system 10. As such, a person skilled in the art will appreciate that there is substantial functional overlap between and among the components. Computer software and user programs can be stored in software storage medium 32 and external storage 38. Executable versions of computer software can be read from storage medium 32 such as non-volatile storage medium, loaded for execution directly into volatile storage medium, executed directly out of non-volatile storage medium, or stored on the secondary storage prior to loading into volatile storage medium for execution.

The computer processing system 28 illustrated in FIG. 2 of the mobile terminal 16 includes a set of computer instructions (in this document, "instructions") for implementing the methods of the anti-spoofing detection system 10 described in this document. The instructions 48 are illustrated in FIG. 2 diagrammatically solely as an aid in understanding the method of the anti-spoofing detection system 10 described in this document. The instructions may be stored in various internal memory or may be implemented in hardware. The instructions may also be included in a computer processing system of a computer located external to the mobile terminal 16, for example, on a secured intranet, on the Internet, or at a base transceiver station 22, from which they may be transmitted to mobile terminal 16. Data associated with the instructions may be received, stored, processed and transmitted to a plurality of mobile terminals 16, but only a single mobile terminal is illustrated to enhance clarity. Data associated with the instructions also may be received, stored, processed and transmitted to/from a plurality of base transceiver stations 22 across a wireless communications system, but only a single base transceiver station 22 is illustrated in FIG. 1 to enhance clarity. Alternately, data associated with the instructions also may be received, stored, processed and transmitted to/from a computer server connected to the wireless network.

Figure 3A:
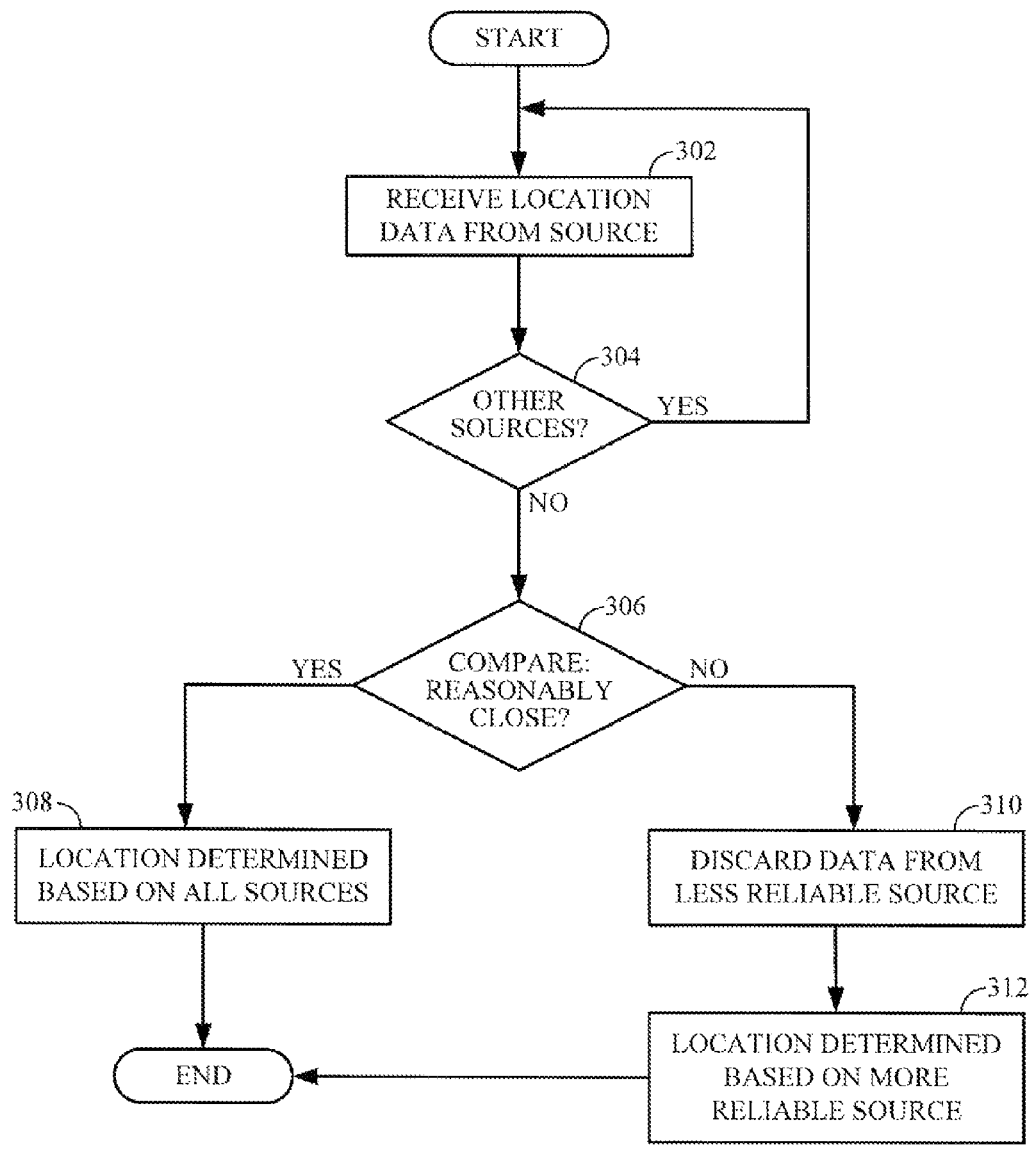
FIG. 3A is a functional block diagram illustrating one aspect of the operation of the anti-spoofing detection system.

Another aspect of the anti-spoofing detection system 10 is illustrated in FIG. 3. FIG. 3A, is a functional block diagram illustrating a method in blocks 302-312 that includes detecting unreliable position location data. As illustrated in block 302, position location data is received from a source. Such data may include one or more inauthentic signals from one or more inauthentic signal sources. The unverified position location data that may include one or more inauthentic signals from one or more inauthentic signal sources may be received by one or more mobile terminals.

As illustrated in block 304, it is determined whether data for additional sources is to be received. If so, the process returns to block 302 to receive the data from another source. In other embodiments, the data may be retrieved from multiple sources simultaneously. Once data has been received from the visible sources, at block 306 the received data is compared. For example, all satellite data could be compared with all data from a terrestrial source, such as a base station, and also compared with another type of data, such as from access points. In another example, data from each individual signal source is compared. In yet another example, a base station almanac for all detected terrestrial sources is consulted to predict locations. The base station almanac may be stored locally, stored remotely on a server (for example, the location server) or downloaded on demand. The predicted locations should be relatively close together and within a radius predicted by either their MAR (max antenna range for base stations) or their max signal strength (e.g., WiFi access points should be visible within say 50 meters but perhaps hundreds of meters). For terrestrial sources, each source should not provide a location that is outside the range predicted by the other sources and the questioned sources' range capabilities. For satellites (or other mobile reference points), on the other hand, a location is calculated for all devices of the same type (e.g., all GPS satellites or all Gallileo satellites or all Glonass satellites) and then the location and associated estimated error predicted by that set of satellites is compared against the location predicted by the terrestrial sources or at least against the overlapping signal ranges of the terrestrial sources. The location and uncertainty area predicted by the associated estimated error should be somewhere among the overlapping ranges or the calculated location should be within reasonable error of that calculated by the terrestrial sources.

If the data is reasonably similar (for example within an expected or reasonable deviation), at block 308 the position is calculated based on all of the data. Each type of source has an expected error associated with it. For example, the error in terrestrial sources may be anywhere from 50 m to thousands of meters or more in the countryside with poor coverage. Thus, a satellite predicted location calculation would need to be within the location and uncertainty are predicted by the error estimated by a base station-based calculation. WiFi access points, may be known to have a range of 50 meters. In this example, the environment is known to be subject to SPS multi-path, so the SPS error may significant. Thus, the signals may be considered to be in agreement if the location calculated by the WiFi access point(s) is within the location estimate and associated uncertainty area predicted by the error in the SPS location estimate.

If, on the other hand, the deviation is so large as to not be attributable to normal error sources, such as multi-path, the less reliable source may be discarded or de-weighted at block 310. In the case of comparing data from one type of source with data from another type of source, all of the signals from the less reliable source could be discarded (for example, all access point data is discarded or all GPS data is discarded; while all Gallileo data might be retained). In the case of comparing data individually, only the deviating data is discarded (for example, only the deviating access point data is discarded). Of course any combination of these discards could also occur.

An exemplary hierarchy of reliability for signal sources includes satellite position system signals, base transceiver station signals, Femtocell signals, Wi-Fi-related signals, WLAN signals, and/or other signals bearing location position data, with the earlier listed signals being considered to have higher reliability. At block 312 the location is calculated with the de-weighted value or without the less reliable discarded value. In one embodiment, the user is notified of the inconsistent data, for example via a display.

Figure 3B:
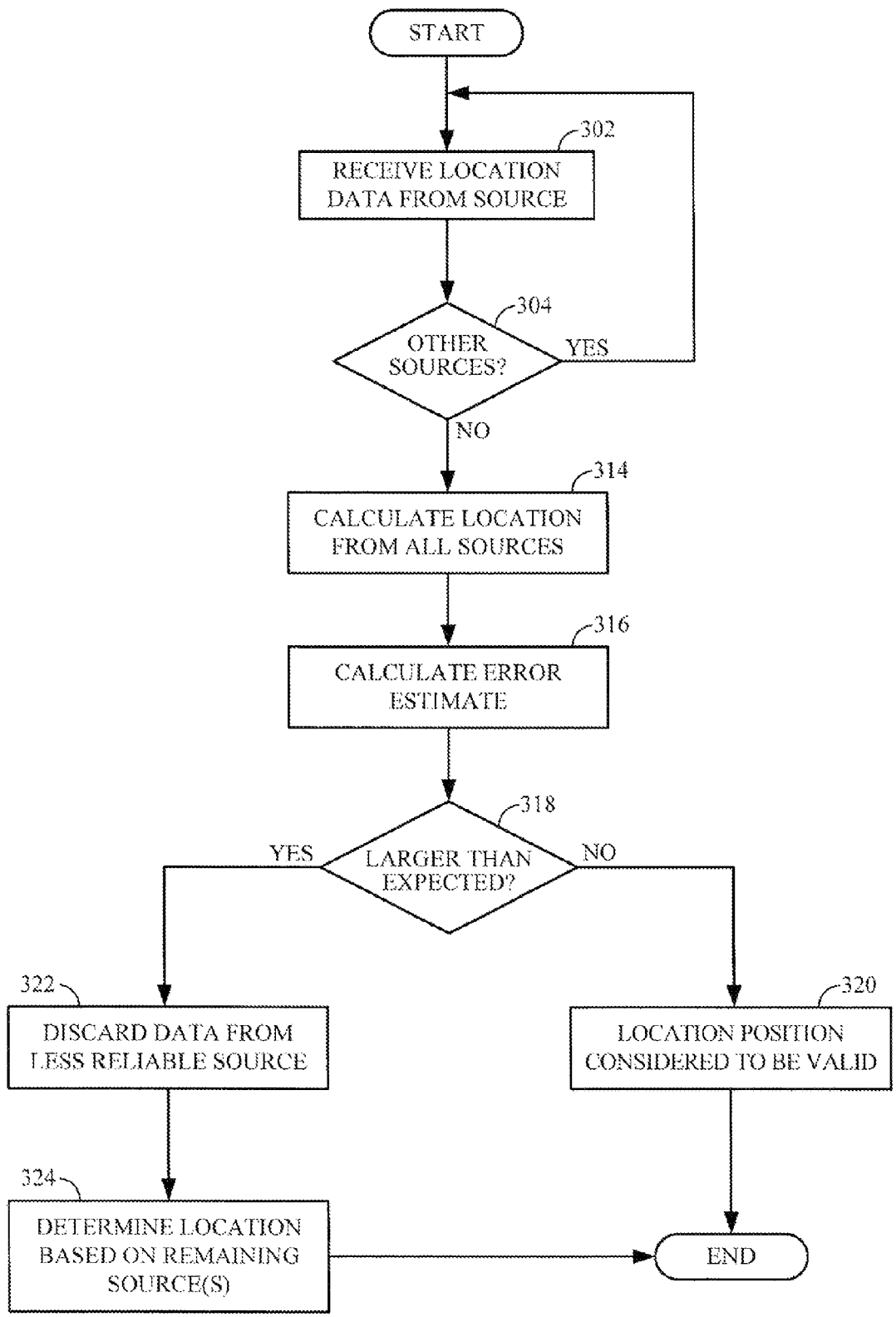
FIG. 3B is a functional block diagram illustrating another aspect of the operation of the anti-spoofing detection system.

Another embodiment is illustrated with respect to FIG. 3B. In this embodiment, a single location is calculated using all sources and an error estimate is calculated. If the error estimate is larger than would be predicted using the types of sources in use, data from the least reliable sources may be either ignored or de-weighted in the calculation.

More specifically, in block 302, position location data is received. As illustrated in block 304, it is determined whether data from additional sources is to be received. If so, the process returns to block 302 to receive the data from another source. Once all data has been received, at block 314 a location is calculated based on data from all sources. At block 318 it is determined whether an error estimate is larger than expected. In another embodiment it is determined whether the location solution converges. If the location solution converges or the error estimate is not larger than expected, at block 320 the calculated location position is considered to be valid.

If the solution does not converge or the error estimate is larger than expected, in one embodiment, less reliable sources are discarded. In another embodiment, multiple position estimates are calculated based on various combinations of the sources. The calculations are compared to determine the source(s) that disagree with the majority of sources. For example, it could be determined whether the source of the divergence is from one type of source (e.g., SPS or WiFi). Alternatively, it could be determined whether one or a few bad sources exist, such as a WiFi access point programmed with a bad location.

In any event, at block 322, the disagreeing sources are discarded (or de-weighted). At block 324 the position is re-calculated using the remaining source(s) or with the de-weighted source(s).

Comparing data from different sources is discussed above. Two embodiments for comparing for consistency are now described. In one embodiment, the locations predicted by each source are compared. For example, with satellites, a location is predicted based on the data received from the satellite. This predicted location is then compared with another source to determine consistency. In the other embodiment, the location has not yet been predicted based on the data received from the satellites. In this case, a terrestrial source is used to obtain a seed location. Based on ephemeris data and the seed location, it can be predicted which satellites should be visible, and what their search window will be. The actual observed satellites and their actual location are then compared with the predicted data to determine whether the seed location and the satellite information are consistent.

Figure 4:
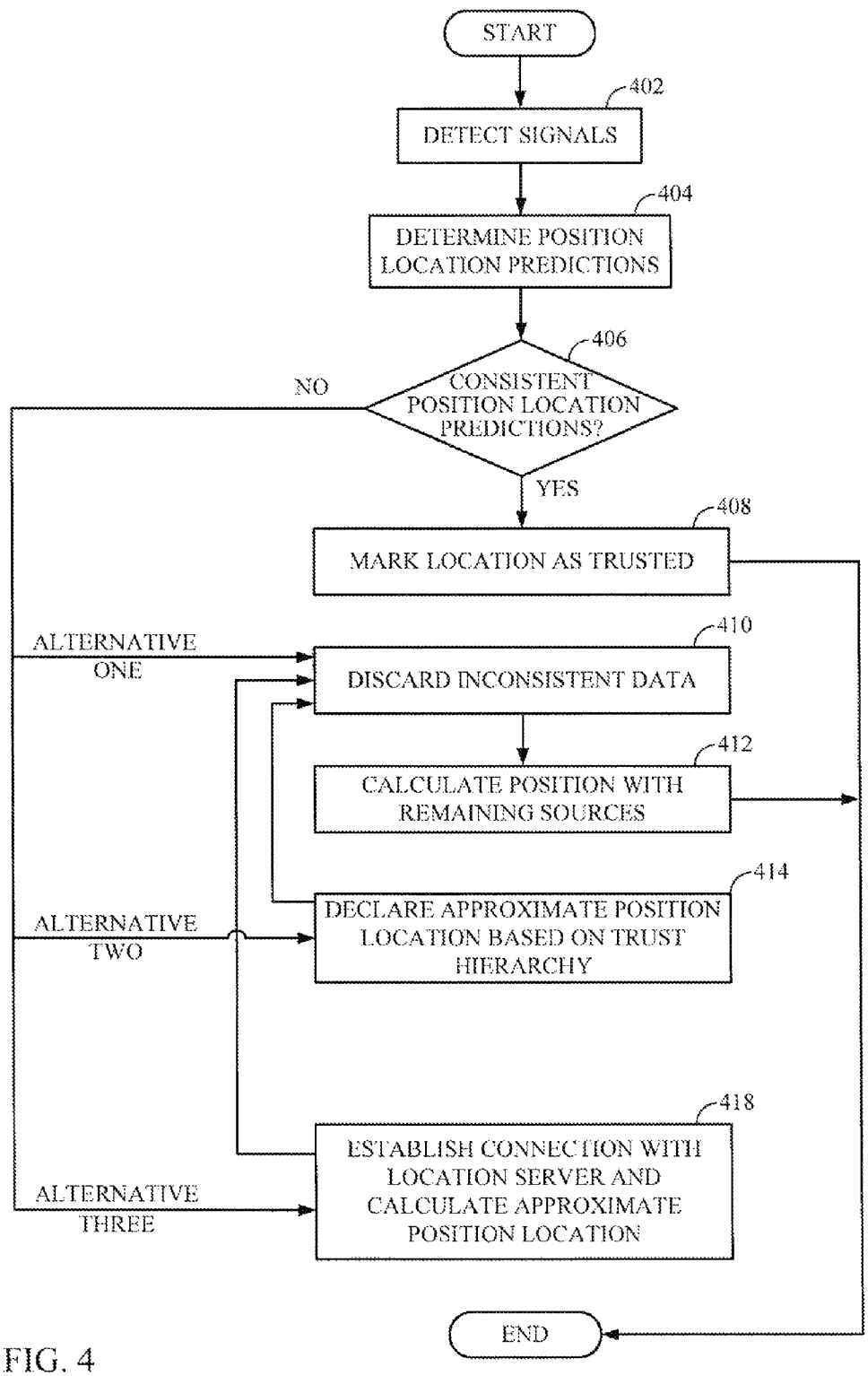
FIG. 4 is a functional block diagram illustrating at least one other aspect of the operation of the anti-spoofing detection system.

Yet another aspect of the anti-spoofing detection system 10 is illustrated in FIG. 4. FIG. 4, is a functional block diagram showing a method of operation of the anti-spoofing detection system 10 in blocks 402-418. As illustrated, in block 402 the system searches for and detects signals within range of the system. Block 404 shows that the system determines position location predictions from the signals. The position location predictions from the signals are compared for consistency at block 406, as discussed above. If it is determined that the position location predictions from the systems are consistent, at block 408 the location calculated from the combination is used, and marked as a trusted position location data.

If it is determined that the position location predictions are inconsistent, three options exist. For the first polling option, in block 410 inconsistent position location data is discarded, and the position is calculated from the remaining signals in block 412.

Alternatively, if a trust option is selected, for example if data is only available from two sources, the process proceeds to block 414. In block 414, an approximate position location is declared based on the most trusted system, for example using the trust hierarchy mentioned above. Measurements disagreeing are then discarded at block 410. At block 412 a potentially reliable position location is calculated to obtain an alternative calculated position location. This location could be marked as having lower confidence. As a person skilled in the art will appreciate, the reliability or confidence assigned the alternative calculated position location marked as being less reliable may also be adjusted for other signal reliability criteria that may be considered, based on the source of the signals, including the distance the signal traveled, the range of the signal output from the signal source, and similar signal criteria.

Yet another alternative can be selected when a location server is available. In block 418, if it is determined that the position location predictions from the signals are inconsistent, an approximate position location may be determined by connecting with at least one location server. The approximate position location is then used to predict SPS constellations. It is then verified whether the visible satellites are consistent with SPS ephemeris and almanac data. Inconsistent data is discarded at block 410. For example, multiple SPS (e.g., Galileo, Glonass, GPS) can be examined, with the system not in agreement being eliminated. The position is calculated with the remaining sources at block 412. To increase accuracy, multiple terrestrial sources could be compared against the SPS data, especially when discarding the SPS data.

As a person skilled in the art will appreciate, the SPS ephemeris may be demodulated for these purposes. In another embodiment, the long term satellite orbit predictions could be periodically downloaded to eliminate the need for the server connection. Although the data is described as being discarded with respect to block 410 it is recognized that the data could be de-weighted instead.

Any machine or computer readable medium tangibly embodying instructions may be used in implementing the methodologies described in this document. As a non-exclusive example, software codes may be stored in a memory as illustrated in FIG. 2, memory of mobile terminal 16, and executed by a processor 28, for example the data processor 30. Memory may be implemented within the processor or external to the processor.

Those skilled in the art also will appreciate that the various illustrative logical blocks, modules, circuits, and algorithm steps described in connection with aspects of the anti-spoofing detection system 10 disclosed in this document may be implemented as electronic hardware, computer software, or combination of both. To clearly illustrate this interchangeability of hardware and software, various illustrative and non-exclusive components, blocks, modules, circuits, and steps have been described in this document generally in terms of functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present disclosure.

Thus, the various illustrative logical blocks, modules, and circuits described in connection with the aspects disclosed in this document may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

The method, apparatus and system described in this document can be embodied in a number of ways and utilized in a number of environments. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination.

Those of skill will also appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The description of the aspects and features is provided to enable any person skilled in the art to make or use the method of improving battery life. Various modifications will be readily apparent to those skilled in the art, and the principles described in this document may be applied to other aspects without departing from the spirit or scope of the teachings herein. Thus, the description is not intended to limit the aspects but to be accorded the widest scope consistent with the principles and novel features disclosed in this document.

Claim elements and steps in this document have been numbered solely as an aid in understanding the description. The numbering is not intended to, and should not be considered as intending to, indicate the ordering of elements and steps in the claims. In addition, the anti-spoofing detection system shown in drawing FIGS. 1 through 4 shows at least one aspect of the anti-spoofing detection system, not intended to be exclusive, but merely illustrative of the disclosed embodiments. Method steps may be interchanged sequentially without departing from the scope of the anti-spoofing detection system.

Means-plus-function clauses in the claims are intended to cover the structures described as performing the recited function that include not only structural equivalents, but also equivalent structures. Likewise, although the system, apparatus and methods provide for use with other devices and technologies, that is not a limitation of future uses of the anti-spoofing detection system, but only recognition of the current ubiquitous nature of the technologies associated with spoofing, which, as a person skilled in the art will appreciate, may change over time.

What is claimed is:

1. A method for estimating a position location of a mobile device, comprising:
    receiving position location data from a plurality of sources including at least a satellite system and a base transceiver station;
    comparing the received position location data at the mobile device;
    marking inconsistent data based on the comparison at the mobile device; and
    estimating the position location based on the received position location data at the mobile device, while accounting for the marked inconsistent data, in which estimating includes discarding or de-weighting the marked inconsistent data that is potentially associated with a spoofing signal.

2. The method of claim 1, in which the marking comprises marking inconsistent data based upon a reliability of each data source.

3. The method of claim 2, in which the reliability of each data source is based upon a hierarchy, the hierarchy comprising a base transceiver station in communication with the mobile device, a satellite system, and a short-ranged wireless protocol access point.

4. The method of claim 1, further comprising sending notification of the marked inconsistent data.

5. The method of claim 1, in which the marking comprises marking inconsistent data that is inconsistent with a majority of the received position location data.

6. The method of claim 1, in which the comparing comprises determining whether a location solution converges.

7. The method of claim 1, in which the comparing comprises determining whether the estimated position location exceeds an error estimate.

8. The method of claim 1, in which the comparing comprises comparing visible satellite data with estimated satellite data, the estimated satellite data being derived based upon a seed location.

9. A non-transitory computer-readable storage medium including program code tangibly stored thereon, comprising:
    program code to receive position location data from a plurality of sources including at least a satellite system and a base transceiver station;
    program code to compare the position location data at a mobile device;
    program code to mark inconsistent data based on the comparison at the mobile device; and
    program code to estimate a position location based on the received position location data at the mobile device, while accounting for the marked inconsistent data, in which to estimate includes discarding or de-weighting the marked inconsistent data that is potentially associated with a spoofing signal.

10. The medium of claim 9, in which the marking comprises marking inconsistent data based upon a reliability of each data source.

11. The medium of claim 9, in which the marking comprises marking inconsistent data that is inconsistent with a majority of the received position location data.

12. The medium of claim 9, in which the comparing comprises determining whether a location solution converges.

13. The medium of claim 9, in which the comparing comprises determining whether the estimated position location exceeds an error estimate.

14. An apparatus for estimating a position location, comprising:
    at least one receiver that receives position location data from a plurality of sources including at least a satellite system and a base transceiver station;
    a processor in a mobile device configured to compare the received position location data, mark inconsistent data based on the comparison, and estimate the position location based on the received position location data, while accounting for the marked inconsistent data, in which estimating includes discarding or de-weighting the marked inconsistent data that is potentially associated with a spoofing signal.

15. The apparatus of claim 14, in which the processor is further configured to mark inconsistent data based upon a reliability of each data source.

16. The apparatus of claim 14, in which the processor is further configured to mark inconsistent data that is inconsistent with a majority of the received position location data.

17. The apparatus of claim 14, in which the processor is further configured to determine whether a location solution converges.

18. The apparatus of claim 14, in which the processor is further configured to determine whether the estimated position location exceeds an error estimate.

19. An apparatus for estimating a position location, comprising:
- means for receiving position location data from a plurality of sources including at least a satellite system and a base transceiver station;
- means for comparing the received position location data at a mobile device;
- means for marking inconsistent data based on the comparison at the mobile device; and
- means for estimating the position location based on the received position location data at the mobile device, while accounting for the marked inconsistent data, in which estimating includes discarding or de-weighting the marked inconsistent data that is potentially associated with a spoofing signal.

\* \* \* \* \*